US008738319B2

(12) United States Patent
Yopp et al.

(10) Patent No.: US 8,738,319 B2
(45) Date of Patent: May 27, 2014

(54) SYSTEM AND METHOD FOR DETECTING A TURNING VEHICLE

(75) Inventors: Wilford Trent Yopp, Canton, MI (US); Peter Gyumyeong Joh, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 746 days.

(21) Appl. No.: 12/915,588

(22) Filed: Oct. 29, 2010

(65) Prior Publication Data

US 2012/0109504 A1 May 3, 2012

(51) Int. Cl.
*G01B 5/04* (2006.01)

(52) U.S. Cl.
USPC ........... 702/159; 702/142; 702/143; 702/155; 702/149; 701/93; 701/96; 701/300; 701/301; 340/435; 340/554; 340/903; 340/904

(58) Field of Classification Search
None
See application file for complete search history.

(56) References Cited

U.S. PATENT DOCUMENTS

| | | | | |
|---|---|---|---|---|
| 4,757,450 | A * | 7/1988 | Etoh | 701/96 |
| 4,802,096 | A * | 1/1989 | Hainsworth et al. | 701/301 |
| 5,026,153 | A * | 6/1991 | Suzuki et al. | 356/3.16 |
| 5,227,784 | A * | 7/1993 | Masamori et al. | 340/903 |
| 5,266,955 | A * | 11/1993 | Izumi et al. | 342/70 |
| 5,471,214 | A | 11/1995 | Faibish et al. | |
| 5,529,138 | A | 6/1996 | Shaw et al. | |
| 5,594,645 | A * | 1/1997 | Nishimura et al. | 701/96 |
| 5,710,565 | A * | 1/1998 | Shirai et al. | 342/70 |
| 5,714,928 | A | 2/1998 | Sudo et al. | |
| 5,973,618 | A * | 10/1999 | Ellis | 340/990 |
| 6,084,508 | A | 7/2000 | Mai et al. | |
| 6,087,975 | A * | 7/2000 | Sugimoto et al. | 342/70 |
| 6,298,298 | B1 * | 10/2001 | Tange et al. | 701/96 |
| 6,304,321 | B1 | 10/2001 | Wangler et al. | |
| 6,343,810 | B1 | 2/2002 | Breed | |
| 6,466,863 | B2 | 10/2002 | Shirai et al. | |
| 6,484,087 | B2 | 11/2002 | Shrai et al. | |
| 6,517,172 | B1 | 2/2003 | Bond, III et al. | |
| 6,523,912 | B1 | 2/2003 | Bond, III et al. | |
| 6,532,408 | B1 | 3/2003 | Breed | |

(Continued)

FOREIGN PATENT DOCUMENTS

JP 7200990 A 8/1995

OTHER PUBLICATIONS

Dabbour E. et al., Perceptual Framework for a Modern Left-Turn Collision Warning System, International Journal of Applied Science, Engineering and Technology 5,vol. 1, 2009, pp. 8-14.

(Continued)

*Primary Examiner* — Thomas Tarcza
*Assistant Examiner* — Richard Goldman
(74) *Attorney, Agent, or Firm* — Frank A. MacKenzie; Brooks Kushman P.C.

(57) ABSTRACT

A sensor system for a host vehicle may detect whether another in-path vehicle is turning. The sensor system may include a transmitter, a receiver and a controller. Signals may be emitted by the transmitter over a detection area. The emitted signals may reflect off an object vehicle in the detection area and be received by the receiver. The receiver may include a number of channels, each corresponding to a different region of the detection area. The sensor system may determine whether the in-path vehicle is turning and in what direction based on the reflected signals received at each channel.

18 Claims, 4 Drawing Sheets

(56) References Cited

U.S. PATENT DOCUMENTS

| | | | |
|---|---|---|---|
| 6,639,543 | B2 | 10/2003 | Puglia |
| 6,640,182 | B2 | 10/2003 | Matsui |
| 6,650,983 | B1 | 11/2003 | Rao et al. |
| 6,885,968 | B2 | 4/2005 | Breed et al. |
| 6,950,014 | B2 | 9/2005 | Rao et al. |
| 7,049,945 | B2 | 5/2006 | Breed et al. |
| 7,486,803 | B2 | 2/2009 | Camus |
| 7,660,438 | B2 | 2/2010 | Camus |
| 2005/0267657 | A1 | 12/2005 | Devdhar |
| 2005/0278098 | A1 | 12/2005 | Breed |
| 2007/0228705 | A1 | 10/2007 | Rao et al. |
| 2009/0018711 | A1 | 1/2009 | Ueda et al. |

OTHER PUBLICATIONS

Press Release, Continental, New Type of Precrash Sensor is Able to Prevent Many Accidents in Urban Traffic, Apr. 18, 2007, pp. 1-4.

Press Release, Continental, World Premiere of Continental Sensor System in the New Volvo XC60, pp. 1-4.

* cited by examiner

SYSTEM AND METHOD FOR DETECTING A TURNING VEHICLE

TECHNICAL FIELD

The present application relates to a system and method for determining whether an object vehicle is changing direction or turning using a sensor system.

BACKGROUND

Vehicle safety systems are becoming increasingly more prevalent in today's vehicles. Some such vehicle safety systems are being incorporated in order to reduce the likelihood or prepare a host vehicle for an imminent crash situation.

One conventional vehicle safety system is a Supplementary Restraint System (SRS). An SRS is an airbag system that works together with conventional three-point seat belts to prevent a driver or passenger from impacting a hard surface (e.g., steering wheel or dashboard) in the event of a collision.

Another conventional vehicle safety system is a Collision-Mitigation-By-Braking (CMBB) system. CMBB systems operate by braking the host vehicle in order to reduce the kinetic energy of an imminent impact, thereby greatly reducing the severity of a crash.

Yet another conventional vehicle safety system is an Adaptive Cruise Control (ACC). ACC operates by automatically adjusting the vehicle speed and distance to that of a target vehicle. An ACC system can operate to decelerate or accelerate the vehicle according to the desired speed and distance settings established by a host vehicle driver.

SUMMARY

A method, according to one or more embodiments of the present application, may include transmitting, from a sensor unit, a number of signal pulses over a detection area external to a host vehicle. The method may further include receiving, at the sensor unit, one or more of the signal pulses reflected from an object vehicle located in the detection area and determining whether the object vehicle is turning based upon the one or more reflected signal pulses.

The sensor unit may include a single transmitter for transmitting the number of signal pulses over the detection area. Moreover, the number of signal pulses may comprise a number of infra-red (IR) light pulses distributed evenly over the detection area through a transmission lens. The sensor unit may include a single receiver for receiving the one or more signal pulses reflected from the object vehicle. The receiver may include a left channel corresponding to a left region of the detection area and a right channel corresponding to a right region of the detection area. The left channel may receive the one or more signal pulses reflected from a left rear portion of the object vehicle at least partially located in the left region of the detection area. Further, the right channel may receive the one or more signal pulses reflected from a right rear portion of the object vehicle at least partially located in the right region of the detection area.

The step of determining whether the object vehicle is turning based upon the one or more reflected signal pulses may include determining a first relative traveling distance between the left rear portion of the object vehicle and the host vehicle based upon the reflected signal pulses received at the left channel of the receiver. The step may further include determining a second relative traveling distance between the right rear portion of the object vehicle and the host vehicle based upon the reflected signal pulses received at the right channel of the receiver and determining whether the object vehicle is turning based upon a difference between the first and second relative traveling distances.

The step of determining whether the object vehicle is turning based upon the difference between the first and second relative traveling distances may include comparing the difference to a threshold and detecting that the object vehicle is turning left upon a determination that the difference exceeds the threshold and the first relative traveling distance is less than the second relative traveling distance.

Alternatively, the step of determining whether the object vehicle is turning based upon the one or more reflected signal pulses may include determining a first relative traveling velocity between the left rear portion of the object vehicle and the host vehicle based upon the reflected signal pulses received at the left channel of the receiver, determining a second relative traveling velocity between the right rear portion of the object vehicle and the host vehicle based upon the reflected signal pulses received at the right channel of the receiver, and determining whether the object vehicle is turning based upon a difference between the first and second relative traveling velocities.

A system, according to one or more embodiments of the present application, may include a sensor unit located on a host vehicle having a transmitter that can emit a signal distributed about a detection area external to the host vehicle. The sensor unit may further include a receiver that can receive one or more left reflected signals corresponding to the transmitted signal reflected from a left rear portion of an object vehicle located in a left region of the detection area. The receiver can also receive one or more right reflected signals corresponding to the transmitted signal reflected from a right rear portion of the object vehicle located in a right region of the detection area. The system may further include a controller configured to determine whether the object vehicle is turning based upon a difference between the left and right reflected signals.

The sensor unit may be mounted behind a central portion of a windshield of the host vehicle. Moreover, the sensor unit may further include a housing for at least partially enclosing the transmitter and the receiver with the windshield.

The transmitter may include a transmission lens and the signal may include a plurality of infrared (IR) light pulses emitted through the transmission lens. The receiver may include a left channel configured to receive the one or more left reflected signals and a right channel configured to receive the one or more right reflected signals. The receiver may further include at least a left receiver lens that directs the one or more left reflected signals to the left channel and a right receiver lens that directs the one or more right reflected signals to the right channel.

The controller may be configured to determine a first relative traveling distance between the left rear portion of the object vehicle and the host vehicle based upon the one or more left reflected signals, determine a second relative traveling distance between the right rear portion of the object vehicle and the host vehicle based upon the one or more right reflected signals, and determine whether the object vehicle is turning based upon a difference between the first and second relative traveling distances. The controller may be further configured to compare the difference between the first and second relative traveling distances to a threshold and detect that the object vehicle is turning right upon a determination that the difference exceeds the threshold and the first relative traveling distance is greater than the second relative traveling distance.

Alternatively, the controller may be configured to determine a first relative traveling velocity between the left rear portion of the object vehicle and the host vehicle based upon the one or more left reflected signals, determine a second relative traveling velocity between the right rear portion of the object vehicle and the host vehicle based upon the one or more right reflected signals, and determine whether the object vehicle is turning based upon a difference between the first and second relative traveling velocities.

A detailed description and accompanying drawings are set forth below.

DETAILED DESCRIPTION

As required, detailed embodiments of the present application are disclosed herein; however, it is to be understood that the disclosed embodiments are merely exemplary of an apparatus, system or method that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
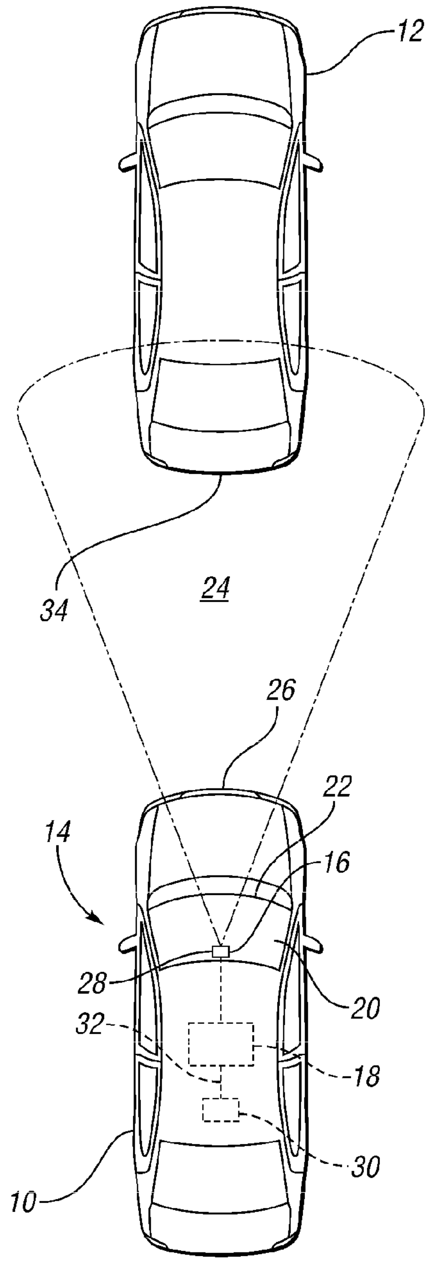
FIG. 1 is a simplified, exemplary environmental diagram depicting a host vehicle trailing an object vehicle according to one or more embodiments of the present application.

With reference to the drawings, FIG. 1 illustrates a simplified, exemplary environmental diagram depicting a host vehicle 10 trailing an object vehicle 12 according to one or more embodiments of the present application. The host vehicle 10 may include a sensor system 14. The sensor system 14 may include a sensor unit 16 and a controller 18. According to one or more embodiments, the controller 18 may be a dedicated control module for the sensor system 14 or may be shared with other vehicle systems. Further, the controller 18 may be integrated with the sensor unit 16 or may be an external device. The sensor system 14 may be used to detect the relative distance and/or the relative velocity of an object such as the object vehicle 12 that may be in front of the host vehicle 10. Accordingly, the sensor system 14 may assist in avoiding or reducing the severity of collisions with the object vehicle 12.

The sensor unit 16 may be located within the host vehicle 10 in a suitable location that can protect it from external elements. For example, the sensor unit 16 may be positioned behind a front windshield 20 of the host vehicle 10. As such, the sensor unit 16 may be protected from ambient conditions that may include rain, snow, sleet, wind, or the like. According to one or more embodiments, the sensor unit 16 may be positioned adjacent a rear-view mirror (not shown). Alternatively, the sensor unit 16 may be positioned on top of the host vehicle's dashboard (not shown) near a base 22 of the windshield 20. Moreover, the mounting location of the sensor unit 16 may be selected to provide the sensor unit 16 with a detection area 24 that projects beyond a front end 26 of the host vehicle 10 to detect objects, such as the object vehicle 12, that the host vehicle 10 may be approaching. In this regard, other mounting locations for the sensor unit 16 may be employed without departing from the scope of the present application, such as behind a vehicle grill, so long as the detection area 24 is not easily obscured.

The sensor unit 16 may include a sensor 28 for the detection of objects within the detection area 24. The sensor 28 may be a laser sensor, sonar sensor, vision sensor, or the like, suitable for detecting objects such as another vehicle in the detection area 24. The sensor system 14 may be employed to detect the relative traveling distance of an object from the host vehicle 10. The sensor system 14 may then use the detected distance in order to determine a relative velocity of the object that may be approaching the host vehicle 10. According to one or more embodiments, the sensor system 14 may be a closing velocity (CV) sensor system and the sensor 28 may be an infrared (IR) light sensor or other closing velocity sensor that may obtain distance data based upon changes in velocity.

The controller 18 may receive the sensed distance and/or velocity data corresponding to an object in the detection area 24 from the sensor unit 16. Further, the controller 18 may process the detected distance and/or relative velocity data and communicate the information to other vehicle performance and safety systems 30 to assist a driver. The controller 18 may communicate distance and velocity data to the other vehicle performance and safety systems 30 via a controller area network (CAN) 32. For instance, the controller 18 may provide distance and velocity data about objects in the detection area 24 to the CAN 32 for use by safety systems such as a supplementary restraint system (SRS), adaptive cruise control (ACC), forward collision warning (FCW), collision mitigation by braking (CMBD), or the like.

According to one or more embodiments, an object in the detection area 24 may be the object vehicle 12. More specifically, the object in the detection area 24 may be a rear end 34 of the object vehicle 12. Thus, the sensor system 14 may obtain distance and/or relative velocity data associated with the rear end 34.

Figure 2:
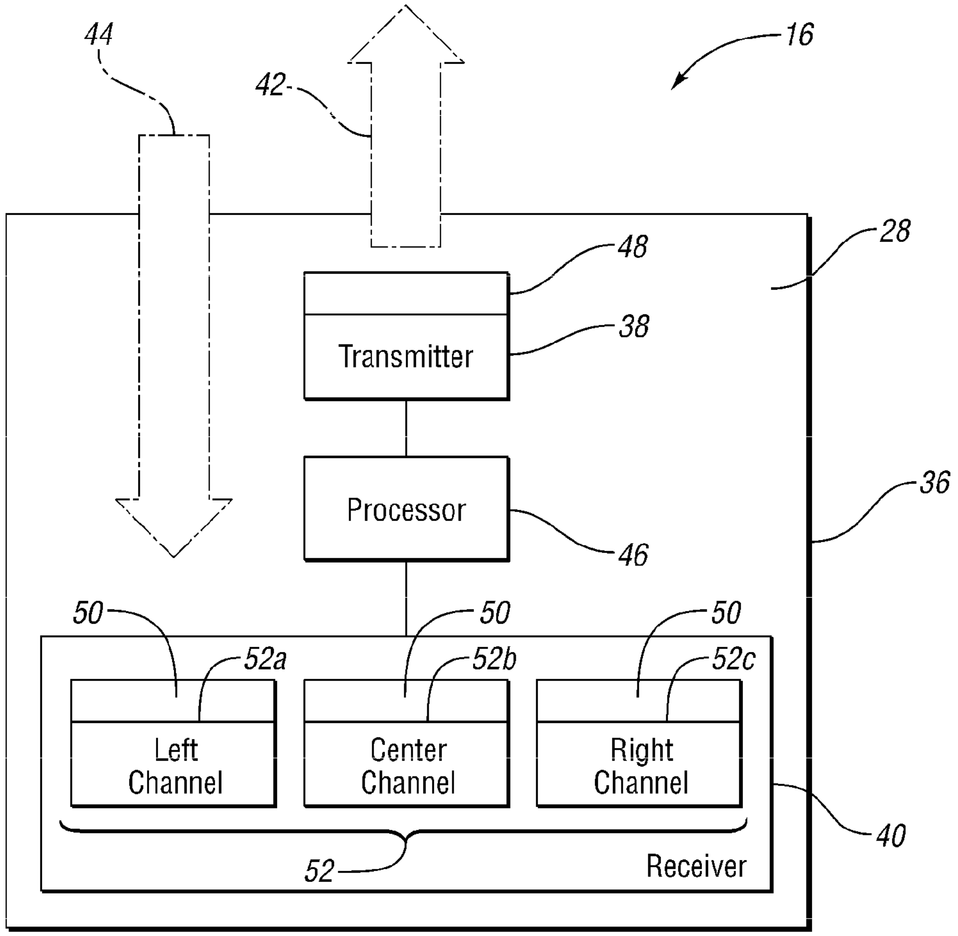
FIG. 2 is a simplified, exemplary block diagram of a sensor unit according to one or more embodiments of the present application.

FIG. 2 illustrates a simplified, exemplary block diagram of the sensor unit 16 according to one or more embodiments of the present application. As seen therein, the sensor unit 16 may include a housing 36 having the sensor 28 enclosed therein. The sensor 28 may include a transmitter 38 and a receiver 40. The transmitter 38 may emit one or more signals 42 over the detection area 24. If an object is located within the detection area 24, the emitted signals 42 may reflect off the object back to the sensor unit 16. The receiver 40 may then receive one or more reflected signals 44. Further, the sensor unit 16 may include a processor 46 and other control hardware and/or software (not shown) to control operation of the transmitter 38 and receiver 40. According to one or more embodiments, the controller 18 and the processor 46 may be the same component or part of the same component. As such, the processor 46 may use the emitted and received signals in order to determine distances between the host vehicle 10 and an object in the detection area 24, such as the object vehicle 12. Moreover, the processor 46 may directly communicate distance and velocity data to the other vehicle performance and safety systems 30 via the CAN 32.

According to one or more embodiments, the signals 42 emitted by the transmitter 38 may be light signals, such as IR laser light signals or the like. For instance, the transmitter 38 may emit a series of laser light pulses. The transmitter 38 may be accompanied by an optical transmission lens 48 that can distribute the emitted laser radiation relatively evenly over the detection area 24. An object in the detection area 24 may reflect one or more of the laser light pulses back to the sensor unit 16. The reflected light pulses may be received at the receiver 40.

According to one or more embodiments, the receiver 40 may include a plurality of optical receiving lenses 50, each associated with a different receiver channel 52. Accordingly, the detection area 24 may be generally subdivided into several detection regions, one for each channel 52. For instance, the receiver 40 may include a left channel 52*a*, a center channel 52*b*, and a right channel 52*c*. The intensity of the reflected light 44 may be measured through each receiving lens 50, for example, by a light-sensitive diode associated with each channel 52.

The processor 46 may collect data from the receiver 40 and may calculate a distance and a velocity for each channel 52 associated with a region in which an object is present. The processor 46 may use time-of-flight measurements of the light pulses between transmission and reception to calculate relative distances between the host vehicle 10 and an object in the detection area 24 of the sensor unit 16, such as the object vehicle 12. Relative velocity data may be generated from changes in the measured distances between the host vehicle 10 and the object vehicle 12 within a defined time period.

The sensor unit 16 may transmit the series of light pulses periodically. Correspondingly, the sensor unit 16 may communicate periodic updates of distance and velocity data for each channel 52 to the controller 18 or other systems 30 via the CAN 32.

Figure 3:
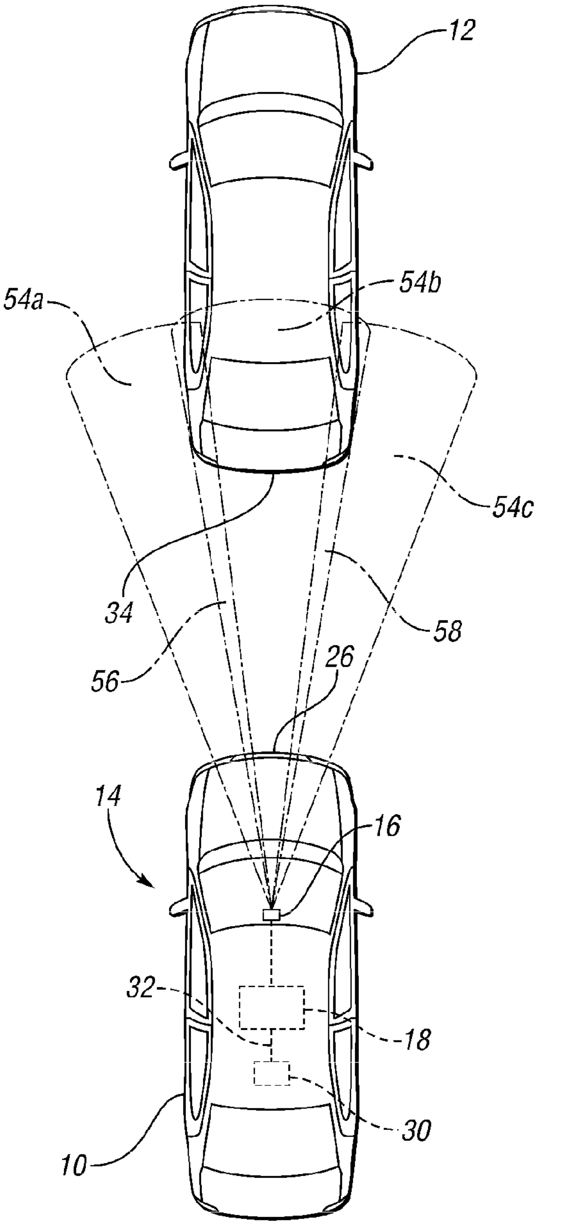
FIG. 3 is a simplified, exemplary environmental diagram depicting an alternate embodiment of the host vehicle trailing the object vehicle.

With reference now to FIG. 3, a simplified, exemplary environmental diagram depicting the host vehicle 10 trailing the object vehicle 12 according to one or more alternate embodiments of the present application is illustrated. As previously described, the detection area 24 may be subdivided into a plurality of detection regions 54, one for each receiver channel 52. For instance, the field of view associated with the left channel 52*a* may correspond to a left detection region 54*a*. Similarly, the field of view associated with the center channel 52*b* may correspond to a center detection region 54*b*. Finally, the field of view associated with the right channel 52*c* may correspond to a right detection region 54*c*. Accordingly, the sensor system may obtain distance and velocity data of an object in one of the left, center and right detection regions independent of the other detection regions. This may be useful in determining directionality of objects approaching the host vehicle 10, e.g., whether an object is approaching from the front left, front center, or front right. As will be described in greater detail, the plurality of detection regions 54 may also allow the sensor system 14 to determine whether an object in front of the host vehicle 10, such as the object vehicle 12, is turning or changing lanes. Of course, greater or fewer detection regions 54 may be provided depending on the number of receiver channels 52 employed in the sensor system 14.

As shown in FIG. 3, portions of the center detection region 54*b* may overlap with the left detection region 54*a* or the right detection region 54*c*. For example, the left detection region 54*a* and the center detection region 54*b* may partially overlap to form a left overlap zone 56. Accordingly, the sensor system 14 may obtain distance and velocity data for an object in the left overlap zone 56 based upon reflected light pulses received at both the left channel 52*a* and the center channel 52*b*. Likewise, the right detection region 54*c* and the center detection region 54*b* may partially overlap to form a right overlap zone 58. Accordingly, the sensor system 14 may obtain distance and velocity data for an object in the right overlap zone 58 based upon reflected light pulses received at both the center channel 52*b* and the right channel 52*c*. Although FIG. 3 depicts portions of the center detection region 54*b* overlapping portions of the left detection region 54*a* and the right detection region 54*c*, according to one or more alternative embodiments, the detection regions 54*a-c* may not overlap.

Figure 4C:
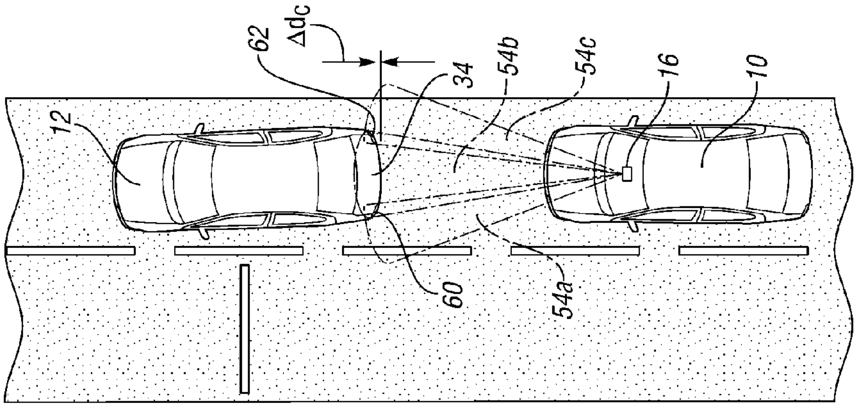
FIG. 4*c* depicts an exemplary environmental diagram of the object vehicle traveling straight according to one or more embodiments of the present application.
Figure 4B:
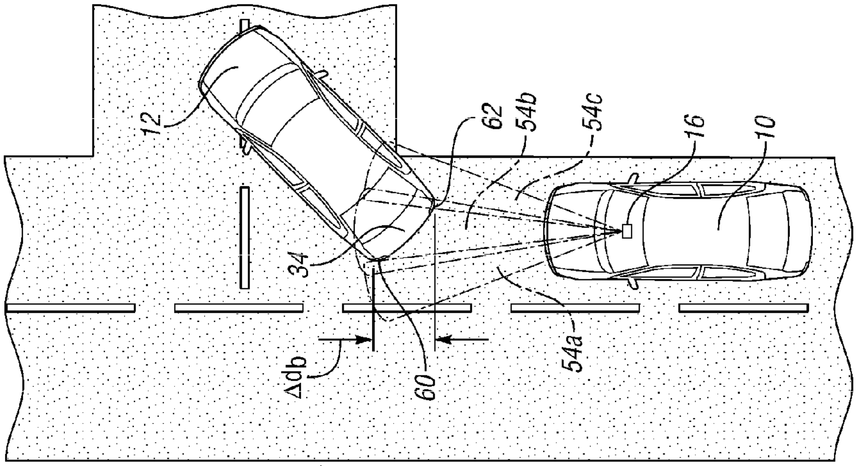
FIG. 4*b* depicts an exemplary environmental diagram of the object vehicle turning right according to one or more embodiments of the present application.
Figure 4A:
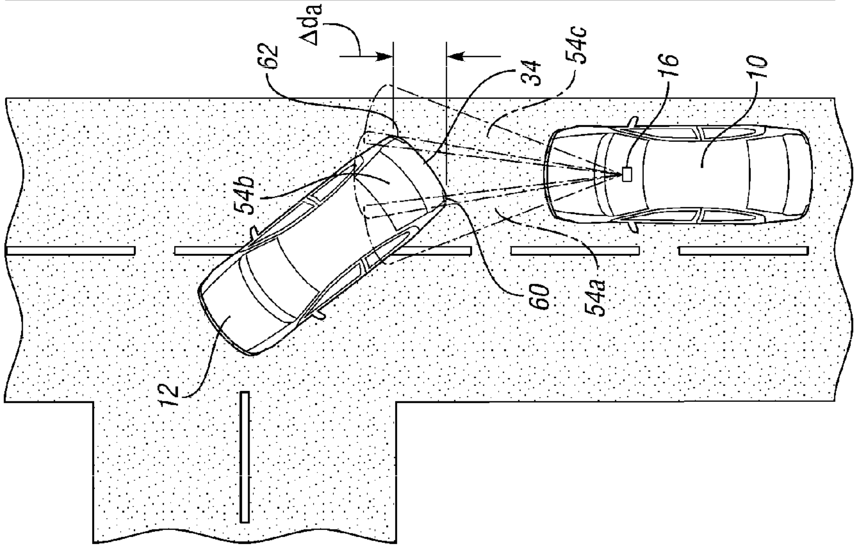
FIG. 4*a* depicts an exemplary environmental diagram of the object vehicle turning left according to one or more embodiments of the present application.

Referring generally to FIGS. 4*a-c*, simplified, exemplary environmental diagrams are shown illustrating how the sensor system 14 may be employed to determine whether the object vehicle 12 in front of the host vehicle 10 is turning. Operation or functionality of the number of vehicle performance and safety systems 30 may be enhanced if it is known whether an in-path vehicle is turning. With specific reference to FIG. 4*a*, the host vehicle 10 may be trailing the object vehicle 12 when the object vehicle 12 begins a left-hand turn. As seen therein, the rear end 34 of the object vehicle 12 may be within the detection area 24 of the sensor system 14. Accordingly, the object vehicle 12 is within sufficient range of the host vehicle 10 for the sensor system 14 to obtain distance and/or relative velocity corresponding to the object vehicle 12.

The rear end 34 of the object vehicle 12 may include a left rear portion 60 and a right rear portion 62. The left rear portion 60 may generally correspond to an area of the rear end 34 proximate the left taillight. The right rear portion 62 may generally correspond to an area of the rear end 34 proximate the right taillight. As shown in FIG. 4*a*, the left rear portion 60 may be at least partially disposed in the left detection region 54*a*. Further, the left rear portion 60 may be at least partially disposed in the left overlap zone 56. Moreover, the right rear portion 62 may be at least partially disposed in the right detection region 54*c*. Similarly, the right rear portion 62 may also be at least partially disposed in the right overlap zone 58. At least a portion of both the left rear portion 60 and the right rear portion 62 may be disposed in the center detection region 54*b*.

When the object vehicle 12 is making a left-hand turn, the distance between the right rear portion 62 of the object vehicle's rear end 34 and the host vehicle 10 may become greater than the distance between the left rear portion 60 and the host vehicle 10. Moreover, the difference in the relative velocity for each of the left rear portion 60 and the right rear portion 62 with respect to the host vehicle 10 may increase or decrease depending on whether the host vehicle 10 is gaining on the object vehicle 12. For instance, if the host vehicle 10 is gaining on the object vehicle 12 while the object vehicle is turning left, the relative closing velocity of the left rear portion 60 with respect to the host vehicle 10 may be greater than the relative closing velocity of the right rear portion 62. Of course, the opposite may occur if the host vehicle 10 is traveling at the same or lesser speed than the object vehicle 12.

The changes in distance and/or relative velocity between the left rear portion 60 and right rear portion 62 of the object vehicle's rear end 34 may be used to detect whether the object vehicle 12 is turning and in which direction. To this end, distance and/or relative velocity data associated with the left rear portion 60 of the object vehicle's rear end 34 may be calculated from reflected light pulses 44 received at the left channel 52*a*, which may correspond to the left detection region 54*a*. Moreover, distance and/or relative velocity data associated with the right rear portion 62 of the object vehicle's rear end 34 may be calculated from reflected light pulses 44 received at the right channel 52*c*, which may correspond to the right detection region 54*c*. Further, the difference (Δd) in distance and/or relative velocity between the left rear portion values and the right rear portion values may be determined. Based on this difference, the sensor system 14 may determine which direction, if any, that the object vehicle 12 is turning.

As shown in FIG. 4*a*, a difference in distance ($\Delta d_a$) between the left rear portion 60 and the right rear portion 62 may be calculated by the sensor system 14. Based on $\Delta d_a$, the sensor system 14 may conclude that the object vehicle 12 is turning left. As shown in FIG. 4*b*, a difference in distance ($\Delta d_b$) between the left rear portion 60 and the right rear portion 62 may be calculated by the sensor system 14. Based on $\Delta d_b$, the sensor system 14 may conclude that the object vehicle 12 is turning right. As shown in FIG. 4*c*, a difference in distance ($\Delta d_c$) between the left rear portion 60 and the right rear portion 62 may be calculated by the sensor system 14. Based on $\Delta d_c$, the sensor system 14 may conclude that the object vehicle 12 is not turning. For instance, $\Delta d_c$ may be relatively small indicating that the left rear portion 60 and the right rear portion 62 of the object vehicle 12 are relatively equidistant from the host vehicle 10 and, thus, not in the progress of turning. Accordingly, the sensor system 14 may compare the difference Δd to a turning threshold. If Δd exceeds the turning threshold, then the sensor system 14 may detect that the object vehicle 12 is turning. Otherwise, the sensor system 14 may conclude that no turn is in progress by the object vehicle 12.

Figure 5:
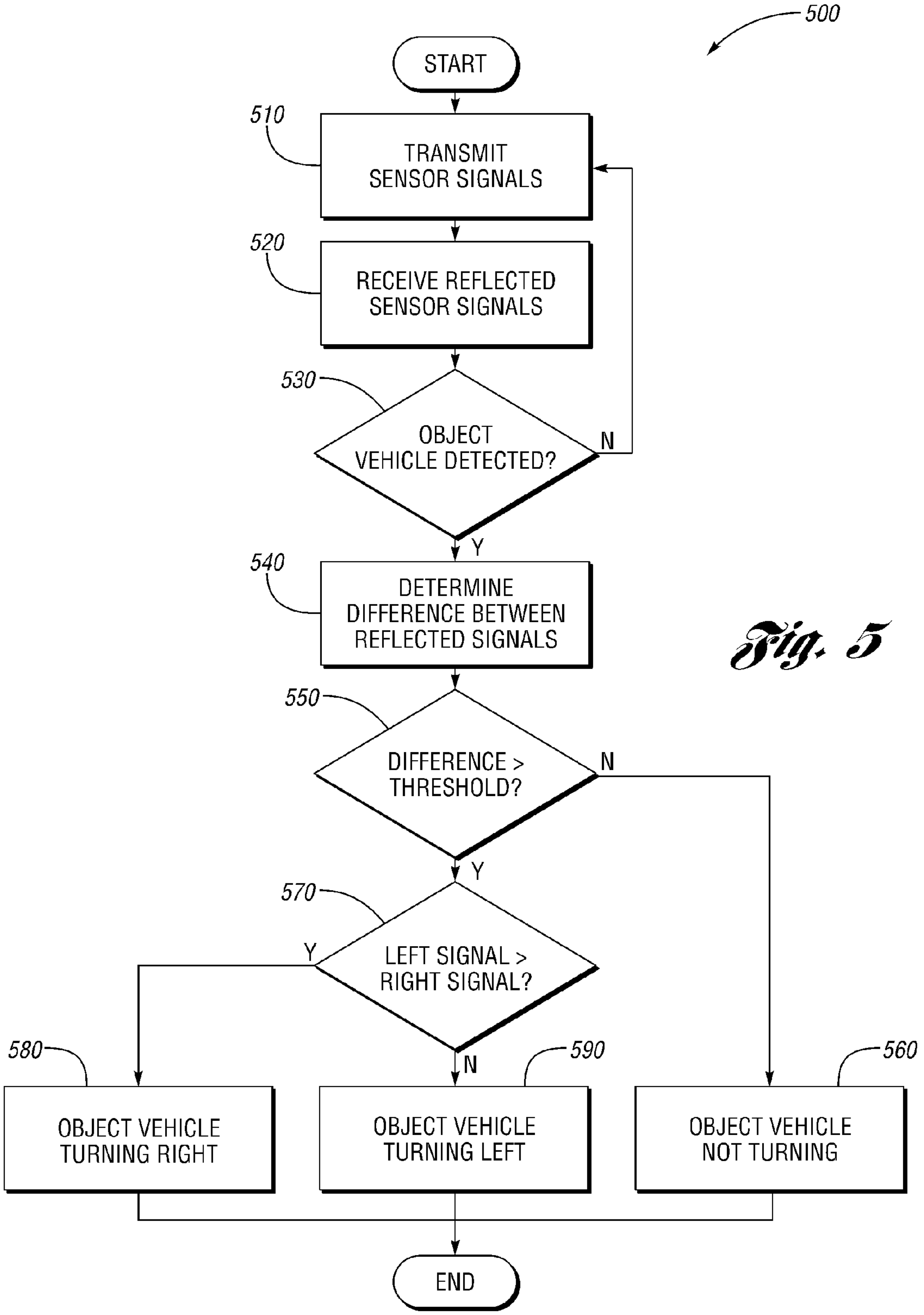
FIG. 5 is a simplified, exemplary flow chart according to one or more embodiments of the present application.

FIG. 5 illustrates a simplified, exemplary flow chart 500 for determining whether an object vehicle 12 is turning. At step 510, the sensor system 14 may transmit signals 42 from the sensor unit 16. For example, the transmitter 38 may periodically emit one or more pulses of laser light. The transmission lens 48 may distribute the radiated light evenly over the detection area 24. At step 520, the sensor unit 16 may receive reflected signals 44. For instance, the laser light pulses emitted by the transmitter 38 may reflect off an object (e.g., the object vehicle 12) in the detection area 24 and be received by the receiver 40 as reflected light pulses. Moreover, reflected light pulses may be received by one or more receiver channels 52, e.g., the left channel 52*a*, the center channel 52*b*, and the right channel 52*c*. Reflected light pulses received at the left channel 52*a* may correspond to an object in the left detection region 54*a*. Likewise, reflected light pulses received at the center channel 52*b* and the right channel 52*c* may correspond to an object located in the center detection region 54*b* and the right detection region 54*c*, respectively.

At step 530, the sensor system 14 may determine whether an object is present in the detection area 24 based on the reflected signals 44 received by the sensor unit 16. Further, the sensor system 14 may determine whether an object detected in the detection area 24 is a vehicle, such as the object vehicle 12. If no object vehicle 12 is detected, the method may return to step 510 and the sensor system 14 may continue to monitor for objects in the detection area 24. If, on the other hand, the sensor system 14 determines that another vehicle is in the detection area 24, then the method may proceed to step 540. The sensor system 14 may calculate distance and/or relative velocity data for both the left rear portion 60 and the right rear portion 62 of the object vehicle 12 with respect to the host vehicle 10. Distance and/or velocity data associated with the left rear portion 60 may be obtained from light pulses reflected off the left rear portion and received at the left channel 52*a* of the receiver 40. Likewise, distance and/or velocity data associated with the right rear portion 62 may be obtained from light pulses reflected off the right rear portion and received at the right channel 52*c* of the receiver 40. At step 540, the sensor system 14 may determine the difference Δd in the distances and/or relative velocities between the left rear portion 60 and the host vehicle 10 and the right rear portion 62 and the host vehicle 10.

At step 550, the sensor system 14 may determine whether the difference Δd exceeds the turning threshold. For example, if the difference Δd is equal to or less than the turning threshold, then the method may proceed to step 560. At step 560, the sensor system 14 may determine that the object vehicle 12 is not turning. However, if at step 550 the difference Δd is greater than the turning threshold, then the sensor system 14 may conclude that the object vehicle 12 is turning and the method may proceed to step 570.

At step 570, the sensor system 14 may compare distance and/or relative velocity data received at the left and right channels 52*a*, 52*c* of the receiver 40. For instance, if the reflected light pulses received at the left and right channels indicate that the left rear portion 60 of the object vehicle 12 is farther away from the host vehicle 10 than the right rear portion 62, then the method may proceed to step 580. At step 580, the sensor system 14 may conclude that the object vehicle 12 is turning to the right of the host vehicle 10. If, on the other hand, the reflected light pulses received at the left and right channels indicate that the left rear portion 60 of the object vehicle 12 is closer to the host vehicle 10 than the right rear portion 62, then the method may proceed to step 590. At step 590, the sensor system 14 may conclude that the object vehicle 12 is turning to the left of the host vehicle 10.

It should be noted that the method of FIG. 5 as described herein is exemplary only, and that the functions or steps of the method could be undertaken other than in the order described and/or simultaneously as may be desired, permitted and/or possible.

While exemplary embodiments are described above, it is not intended that these embodiments describe all possible embodiments of the application. Rather, the words used in the specification are words of description rather than limitation, and it is understood that various changes may be made without departing from the spirit and scope of the application. Additionally, the features of various implementing embodiments may be combined to form further embodiments of the application.

What is claimed:

1. A method comprising:

transmitting, from a sensor unit including a single transmitter, a number of signal pulses distributed, by a transmission lens, over a detection area external to a host vehicle;

receiving, at the sensor unit, one or more of the signal pulses reflected from an object vehicle located in the detection area; and detecting whether the object vehicle is turning based upon the one or more reflected signal pulses.

2. The method of claim 1, wherein the number of signal pulses comprises a number of infra-red (IR) light pulses distributed evenly over the detection area through the transmission lens.

3. The method of claim 1, wherein the sensor unit includes a single receiver having a plurality of receiving lenses for receiving the one or more signal pulses reflected from the object vehicle.

4. The method of claim 3, wherein the receiver comprises:

a left channel corresponding to a left region of the detection area; and a right channel corresponding to a right region of the detection area.

5. The method of claim 4, wherein the left channel receives the one or more signal pulses reflected from a left rear portion of the object vehicle at least partially located in the left region of the detection area, and the right channel receives the one or more signal pulses reflected from a right rear portion of the object vehicle at least partially located in the right region of the detection area.

6. The method of claim 5, wherein the step of detecting whether the object vehicle is turning based upon the one or more reflected signal pulses includes:

calculating a first relative traveling distance between the left rear portion of the object vehicle and the host vehicle based upon the reflected signal pulses received at the left channel of the receiver;

calculating a second relative traveling distance between the right rear portion of the object vehicle and the host vehicle based upon the reflected signal pulses received at the right channel of the receiver; and detecting whether the object vehicle is turning based upon a difference between the first and second relative traveling distances.

7. The method of claim 6, wherein the step of detecting whether the object vehicle is turning based upon the difference between the first and second relative traveling distances includes:

comparing the difference to a threshold; and detecting that the object vehicle is turning left upon a determination that the difference exceeds the threshold and the first relative traveling distance is less than the second relative traveling distance.

8. The method of claim 5, wherein the step of detecting whether the object vehicle is turning based upon the one or more reflected signal pulses includes:

calculating a first relative traveling velocity between the left rear portion of the object vehicle and the host vehicle based upon the reflected signal pulses received at the left channel of the receiver;

calculating a second relative traveling velocity between the right rear portion of the object vehicle and the host vehicle based upon the reflected signal pulses received at the right channel of the receiver; and detecting whether the object vehicle is turning based upon a difference between the first and second relative traveling velocities.

9. A system comprising:

a sensor unit located on a host vehicle including:

a transmitter that emits a signal distributed about a detection area external to the host vehicle, and a receiver that receives one or more left reflected signals corresponding to the transmitted signal reflected from a left rear portion of an object vehicle located in a left region of the detection area and one or more right reflected signals corresponding to the transmitted signal reflected from a right rear portion of the object vehicle located in a right region of the detection area; and a controller configured to detect whether the object vehicle is turning based upon a time difference between when the left and right reflected signals are received.

10. The system of claim 9, wherein the transmitter includes a transmission lens and the signal includes a plurality of infrared (IR) light pulses emitted through the transmission lens.

11. The system of claim 9, wherein the receiver includes:

a left channel configured to receive the one or more left reflected signals; and a right channel configured to receive the one or more right reflected signals.

12. The system of claim 11, wherein the receiver further includes at least a left receiver lens that directs the one or more left reflected signals to the left channel and a right receiver lens that directs the one or more right reflected signals to the right channel.

13. The system of claim 9, wherein in detecting whether the object vehicle is turning based upon a time difference between when the left and right reflected signals are received, the controller is configured to:

calculate a first relative traveling distance between the left rear portion of the object vehicle and the host vehicle based upon when the one or more left reflected signals are received;

calculate a second relative traveling distance between the right rear portion of the object vehicle and the host vehicle based upon when the one or more right reflected signals are received; and detect whether the object vehicle is turning based upon a difference between the first and second relative traveling distances.

14. The system of claim 13, wherein the controller is further configured to:

compare the difference between the first and second relative traveling distances to a predetermined turning threshold; and detect that the object vehicle is turning right upon a determination that the difference exceeds the turning threshold and the first relative traveling distance is greater than the second relative traveling distance.

15. The system of claim 9, wherein in detecting whether the object vehicle is turning based upon a time difference between when the left and right reflected signals are received, the controller is configured to:

calculate a first relative traveling velocity between the left rear portion of the object vehicle and the host vehicle based upon when the one or more left reflected signals are received;

calculate a second relative traveling velocity between the right rear portion of the object vehicle and the host vehicle based upon when the one or more right reflected signals are received; and detect whether the object vehicle is turning based upon a difference between the first and second relative traveling velocities.

16. The system of claim 9, wherein the sensor unit is mounted behind a central portion of a windshield of the host vehicle.

17. A method comprising:

transmitting a number of infrared (IR) light pulses from a transmitter disposed in a sensor unit mounted on a host vehicle, the number of light pulses distributed evenly over a detection area in front of the host vehicle;

receiving, at a receiver disposed in the sensor unit, one or more of the light pulses reflected from an object vehicle located in the detection area, the receiver including at least a left channel corresponding to a left region of the detection area and a right channel corresponding to a right region of the detection area, the left channel receiving reflected light pulses from a left rear portion of the object vehicle in the left region, the right channel receiving reflected light pulses from a right rear portion of the object vehicle in the right region;

calculating a first distance between the left rear portion of the object vehicle and the host vehicle based upon the reflected light pulses received at the left channel of the receiver;

calculating a second distance between the right rear portion of the object vehicle and the host vehicle based upon the reflected light pulses received at the right channel;

calculating a difference between the first distance and the second distance; and detecting whether the object vehicle is turning based upon the difference between the first distance and the second distance.

18. The method of claim 17, wherein the step of detecting whether the object vehicle is turning based upon the difference between the first distance and the second distance includes:

comparing the difference to a threshold; and detecting that the object vehicle is not turning upon a determination that the difference does not exceed the threshold.

* * * * *